United States Patent
Krishnan et al.

(10) Patent No.: US 11,036,615 B2
(45) Date of Patent: Jun. 15, 2021

(54) AUTOMATICALLY PERFORMING AND EVALUATING PILOT TESTING OF SOFTWARE

(71) Applicant: MICROSOFT TECHNOLOGY LICENSING, LLC, Redmond, WA (US)

(72) Inventors: Vijay Krishnan, Sammamish, WA (US); Sandipan Ganguly, Redmond, WA (US); Ritu Singh, Bellevue, WA (US); Shashidhar Rajashekara, Sammamish, WA (US); Muskan Kukreja, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/212,668

(22) Filed: Dec. 6, 2018

(65) Prior Publication Data

US 2020/0183811 A1 Jun. 11, 2020

(51) Int. Cl.
*G06F 11/36* (2006.01)

(52) U.S. Cl.
CPC ...... *G06F 11/3616* (2013.01); *G06F 11/3608* (2013.01); *G06F 11/3664* (2013.01); *G06F 11/3672* (2013.01); *G06F 11/3696* (2013.01); *G06F 2201/81* (2013.01); *G06F 2201/865* (2013.01)

(58) Field of Classification Search
CPC ............. G06F 11/3608; G06F 11/3616; G06F 11/3664; G06F 11/3672; G06F 11/3696
See application file for complete search history.

(56) References Cited

U.S. PATENT DOCUMENTS

| | | | |
|---|---|---|---|
| 8,024,303 | B2 | 9/2011 | Roehrle et al. |
| 9,009,738 | B2 | 4/2015 | Matichuk |
| 9,246,935 | B2 | 1/2016 | Lietz et al. |
| 9,268,663 | B1 | 2/2016 | Siddiqui et al. |

(Continued)

FOREIGN PATENT DOCUMENTS

| | | |
|---|---|---|
| WO | 2012167190 A1 | 12/2012 |
| WO | 2017071425 A1 | 5/2017 |

OTHER PUBLICATIONS

Rajiv D. Banker et al., Gauging the Quality of Managerial Decision Regarding Information Technology Deployment, IEEE, 1991, retrieved online on Feb. 10, 2021, pp. 276-286. Retrieved from the Internet: <URL: https://ieeexplore.ieee.org/stamp/stamp.jsp?tp=& arnumber= 184070>. (Year: 1991).*

(Continued)

*Primary Examiner* — Hanh Thi-Minh Bui
(74) *Attorney, Agent, or Firm* — NovoTechIP International PLLC

(57) ABSTRACT

A method of and system for performing pilot testing of a software program in an organization is carried out by collecting pilot testing data generated from a pilot testing of a software program run on one or more hardware assets in the organization, determining whether a sufficient amount of pilot testing data has been collected, and, when so, calculating one or more pilot test metrics from the collected data. The calculated pilot test metrics may then be compared to similar metrics in a target population to evaluate the software program.

24 Claims, 9 Drawing Sheets

(56) References Cited

U.S. PATENT DOCUMENTS

| | | | |
|---|---|---|---|
| 9,684,579 B1 | 6/2017 | Adams et al. | |
| 9,703,691 B1 | 7/2017 | Yim et al. | |
| 9,934,384 B2 | 4/2018 | Johansson et al. | |
| 10,067,857 B2 | 9/2018 | Ekambaram et al. | |
| 10,073,692 B2 | 9/2018 | Carter | |
| 2012/0266155 A1* | 10/2012 | Valeriano | G06F 8/65 |
| | | | 717/172 |
| 2014/0278198 A1 | 9/2014 | Lyon et al. | |
| 2015/0012852 A1 | 1/2015 | Borodin et al. | |
| 2015/0317235 A1 | 11/2015 | Lachambre et al. | |
| 2016/0259638 A1 | 9/2016 | El Maghraoui et al. | |
| 2019/0034315 A1* | 1/2019 | Acosta | G06F 8/658 |
| 2019/0050321 A1* | 2/2019 | Sapozhnikov | G06F 11/3664 |
| 2019/0391798 A1* | 12/2019 | Farrell | G06F 11/3672 |

OTHER PUBLICATIONS

"Create a Device Pool in AWS Device Farm", Retrieved from: https://web.archive.org/web/20150717221738/https:/docs.aws.amazon.com/devicefarm/latest/developerguide/how-to-create-device-pool.html, Jul. 17, 2015, 3 Pages.

"Firebase Test Lab", Retrieved from: https://firebase.google.com/docs/test-lab/, Retrieved on: May 24, 2018, 4 Pages.

"Mobile App Testing Made Scalable", Retrieved from: https://bitbar.com/testing/, Retrieved on: May 24, 2018, 5 Pages.

"U.S. Appl. No. 16/035,634", filed Jul. 14, 2018, 41 Pages.

"PCT Applicatoin Filed under PCT Application No. PCT/CN18/091500", Filed Date: Jun. 15, 2018, 43 Pages.

"International Search Report and Written Opinion Issued in PCT Application No. PCT/US2019/063823", dated Apr. 15, 2020, 11 Pages.

\* cited by examiner

| SYSTEM HEALTH 410 | SUDDEN EXITS | EXACT CRASH STACK | PRODUCT RELIABILITY DATA | |
|---|---|---|---|---|
| USAGE 420 | ENGAGEMENT TIME | NUMBER OF COLLABORATIONS | NUMBER OF FILES ACCESSED | NUMBER OF CLICKS |
| CUSTOMER SENTIMENT 430 | NPS | EMOTICON | SURVEY RESPONSE | CUSTOMER FEELING |
| PERFORMANCE 440 | TIME TO COMPLETE ACTION | | RESPONSE TIME | |

| | INSUFFICIENT DATA DEVICE CRASH METRICS | HEALTHY DEVICE CRASH METRICS | REGRESSION DEVICE CRASH METRICS |
|---|---|---|---|
| INSUFFICIENT DATA - SESSION CRASH METRICS | DATA INSUFFICIENT | PASS | DATA INSUFFICIENT |
| HEALTHY SESSION CRASH METRICS | PASS | PASS | INFORM ADMIN |
| REGRESSION SESSION CRASH METRICS | DATA INSUFFICIENT | INFORM ADMIN | FAILED |

FIG. 5

AUTOMATICALLY PERFORMING AND EVALUATING PILOT TESTING OF SOFTWARE

TECHNICAL FIELD

This disclosure relates generally to automating pilot testing of software and, more particularly, to an improved method of and system for automatically determining if a pilot testing of a software program is successful.

BACKGROUND

Traditionally, deploying new software and/or updating existing software to a newer version in organizations is performed by one or more administrators who are required to manually test most applications and add-ins and make a personal determination as to whether to apply the software upgrade to the computer devices in the organization. Depending on the number of users and information technology (IT) assets, the testing process may be very lengthy and complex. This process has become even more cumbersome as the number of updates to existing software programs in organizations have substantially increased in recent years.

A decision on whether to move forward with deployment is usually made based on information gathered during the testing process, and is subjective. This is not only manually intensive and time consuming, it may also not produce the best result, as the ultimate decision is subjective and dependent on the opinions and risk-tolerance of the administrators in charge.

Hence, there is a need for improved systems and methods for performing pilot testing of software which is accurate, reliable and efficient.

SUMMARY

In one general aspect, the instant application describes a device having one or more processors and a memory in communication with the one or more processors, where the memory comprises executable instructions that, when executed by the one or more processors, cause the device to perform multiple functions. These functions may include collecting pilot testing data generated from a pilot testing of a software program which is running on one or more hardware assets in an organization, determining whether a sufficient amount of the pilot testing data has been collected, upon determining that the sufficient amount of the pilot testing data has been collected, calculating a pilot test metric from the collected pilot testing data, and comparing the pilot testing metric with a corresponding metric in a target population to automatically evaluate the software program.

In another general aspect the functions may also include receiving a request to perform the pilot testing, configuring one or more parameters for performing the pilot testing, and automatically determining at least in part based on results of evaluating the software program if the pilot testing should be extended to one or more other hardware assets, if the software program should be fully deployed in the organization, or if the pilot testing should be stopped.

In yet another general aspect, the instant application describes a method for performing pilot testing of a software program in an organization, where the method may include the steps of collecting pilot testing data generated from performing the pilot testing of the software program on one or more hardware assets in the organization, determining whether a sufficient amount of the pilot testing data has been collected, calculating a pilot test metric from the collected pilot testing data, upon determining that the sufficient amount of the pilot testing data has been collected, and comparing the pilot testing metric with a corresponding metric in a target population to evaluate the software program.

In a further general aspect, the instant application describes a non-transitory computer readable medium on which are stored instructions that when executed cause a programmable device to collect pilot testing data generated from performing the pilot testing of the software program on one or more hardware assets in the organization, determine whether a sufficient amount of the pilot testing data has been collected, calculate a pilot test metric from the collected pilot testing data, upon determining that the sufficient amount of the pilot testing data has been collected, and compare the pilot testing metric with a corresponding metric in a target population to evaluate the software program.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

FIG. 4 illustrates example metric parameters upon which pilot testing of a software program can be measured.

FIG. 5 depicts an example decision tree 500 for deciding how to proceed once or more metric parameters have been calculated for a pilot test.

DETAILED DESCRIPTION

In the following detailed description, numerous specific details are set forth by way of examples in order to provide a thorough understanding of the relevant teachings. It will be apparent to persons of ordinary skill, upon reading this description, that various aspects can be practiced without such details. In other instances, well known methods, procedures, components, and/or circuitry have been described at a relatively high-level, without detail, in order to avoid unnecessarily obscuring aspects of the present teachings.

In an example, this description is related to technology implemented for an improved method and system of performing pilot testing of new or updated software programs in an organization before the new or updated software is deploying to a larger group in the organization. To improve the current methods of performing such testing, the technical automated solution enables selection of test parameters by which to measure the performance of the new and/or updated software, and provides for selecting a sample population to compare the measurements to, enables selection of additional parameters such as a preferred statistical method for comparison, tolerance level, and a minimum number of devices and/or sessions to run the test on, before starting a pilot test to collect data. The collected data may then be compared against data retrieved from a sample population, when it is determined that sufficient data has been collected, to determine if the collected data satisfies one or more thresholds upon which the method can decide whether to expand the test to a larger group, deploy the new and/or updated software to the entire relevant population in the enterprise, stop further testing and deployment, or allow an administrator to decide how to proceed. Data collected during the testing process may be stored and analyzed for future reference and used in training machine learning models that decide how to proceed based on the collected data. As a result, the solution provides a customizable efficient and accurate method by which pilot testing of new and updated software can be performed in organizations.

As will be understood by persons of skill in the art upon reading this disclosure, benefits and advantages provided by such implementations can include, but are not limited to, a solution to the technical problems of inefficient, labor intensive and unreliable pilot testing of new and/or updated software in organizations. Technical solutions and implementations provided here optimize and improve the process of pilot testing software programs before full deployment. The benefits provided by these solutions include providing increased accuracy, reliability and efficiency in testing software programs and reducing the amount of human labor and oversight needed for such processes.

Figure 1:
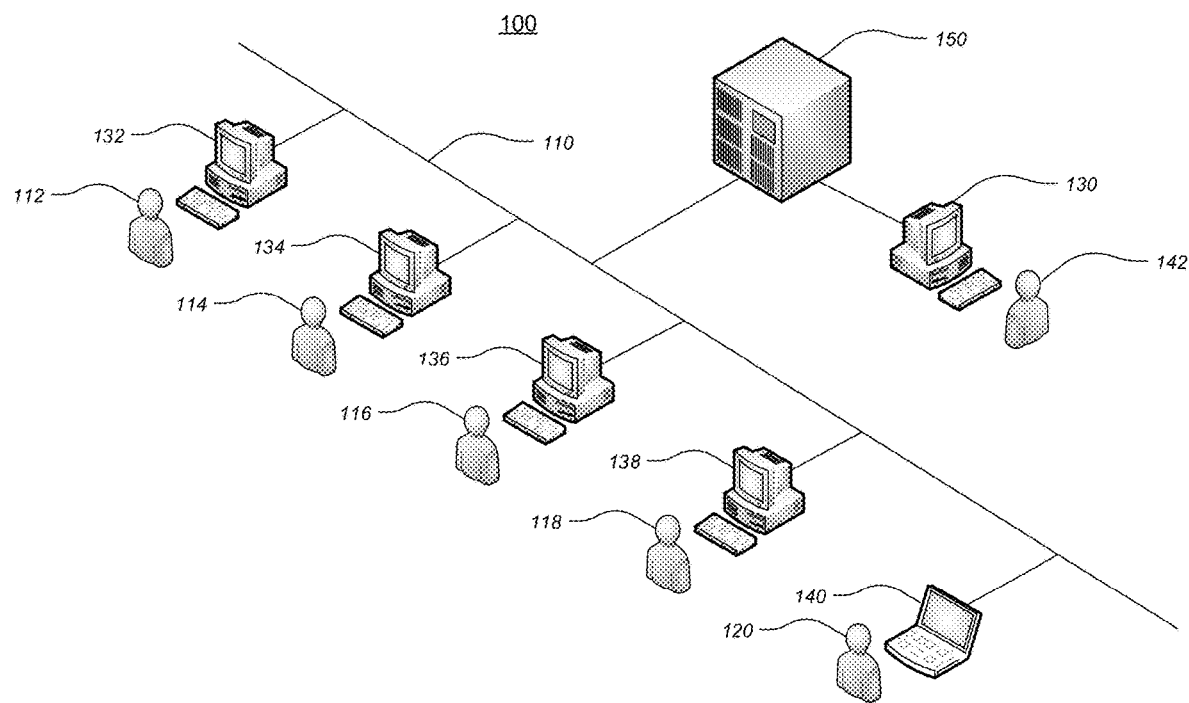
FIG. 1 illustrates an example IT system including a plurality of IT assets.

FIG. 1 illustrates an example IT system 100 of an organization, upon which aspects of this disclosure may be implemented. The IT system 100 may be implemented in a single site or spread out in a number of buildings or geographically separated locations. The IT system 100 may include a plurality of IT assets (hereinafter "assets"), including a first hardware asset 132, second hardware asset 134, third hardware asset 136, fourth hardware asset 138 and fifth hardware asset 14, connected to a network 110. The network 110 may be a wired or wireless network or a combination of wired and wireless networks. The hardware assets 132, 134, 136, 138 and 140 may be assigned to and used by first, second, third, fourth and fifth users 112, 114, 116, 118, and 120, respectively. The hardware assets 132, 134, 136, 138 and 140 may be connected to a server 150 via the network 110. In one implementation, the server 150 may be configured to perform one or more steps of the methods disclosed herein. Alternatively, the one or more steps may be done by a device 130 connected locally or remotely to the network 110. The device 130 may be operated by a user 142, who may be an administrator of the network 110.

It should be noted that although only five hardware assets 132, 134, 136, 138 and 140 are shown in FIG. 1, the actual number of assets in the IT system 100 may vary depending on the size and type of the organization. For example, the IT system 100 for a large IT company may include more than a thousand or ten thousand hardware assets, which may be spread out in different geographical locations. The hardware assets may include any stationary or mobile computing device configured to communicate via the network 110. For example, the hardware assets may include workstations, desktops, laptops, tablets, smart phones, cellular phones, personal data assistants (PDA), printers, scanners, telephone, or any other device that can be subject to software/hardware changes. While it is possible for a very few of the hardware assets to have exactly the same hardware/software configurations, most of the hardware assets may have a unique hardware/software configuration that can be drastically different from other hardware assets.

In addition to the hardware assets, the organization may have software assets that are run on the one or more hardware assets. Depending on an organization size, software assets in an organization can be as many as hundreds or even thousands, which may be installed in hardware assets of the organization in various configurations and combinations. The software assets may include any type of computer programs, such as, an operating system (OS), software application, software add-in, driver, etc., which may be operated by one or more assets of the organization. A software application (or application) may refer to any computer program designed to perform a group of coordinated functions, tasks, or activities, such as, antivirus application, productivity suite, media creation application, mortgage calculation application, human resource (HR) management application, etc. A software add-in (or add-in) may refer to a software component (e.g., a macro, patch, pack, package, plug-ins, etc.) that adds a specific feature to an existing computer program. A software update (or update) may refer to any software change to the exiting IT assets, including, for example, a new software installation, update to an existing software piece, upgrade to a new version, modification, uninstallation or removal of an existing software piece, etc.

When a new software and/or a software upgrade becomes available for the IT system 100, one or more of the assets 132, 134, 136, 138 and 140 may be selected to run a pilot test for validating the new software and/or a software upgrade before it is deployed to the entire IT system 100. Previously, this would require the administrator 142 to make a determination as to which assets should be used for the pilot test and to manually deploy the new software and/or a software upgrade to those assets. The administrator 142 would then need to monitor the assets selected and obtain feedback from the user using the selected asset to determine if the pilot test is successful. This can be a manually intensive and unreliable method. The improved method and system of performing pilot testing of new and updated software addresses these disadvantages as discussed below.

Figure 2:
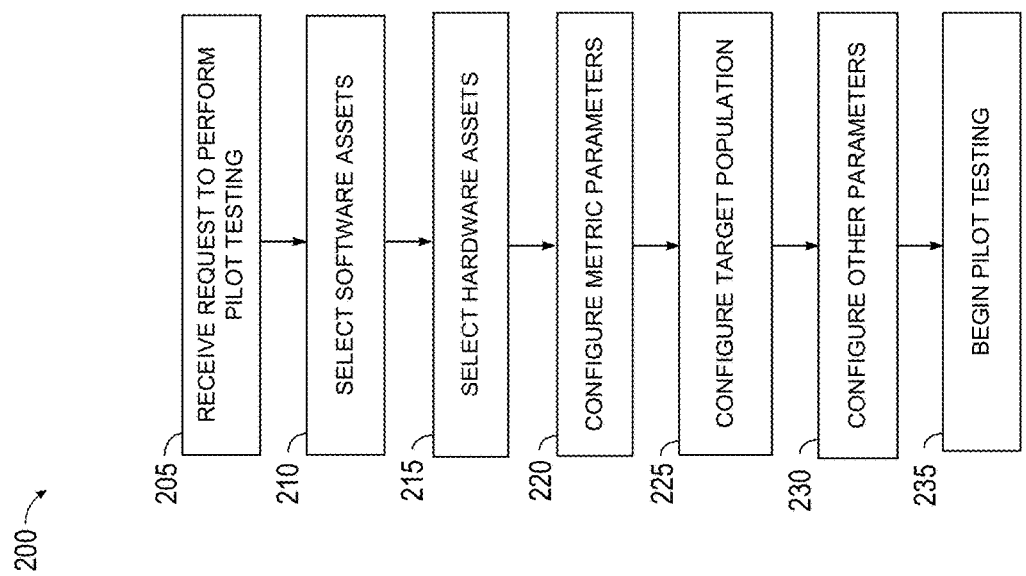
FIG. 2 is a flow diagram depicting an example method for configuring parameters for an improved process of performing pilot testing of software in an organization.

FIG. 2 is a flow diagram depicting an example method 200 for configuring parameters for an improved process of performing pilot testing of new and updated software in an organization. At 205, the method 200 begins by receiving a request to perform pilot testing of one or more software programs. The software program(s) may be new to the IT system of the organization or may be an update to existing software program(s) used in one or more hardware assets of the IT system. The request may be received from an IT administrator, such as administrator 142 of FIG. 1, utilizing a user device. This may be done, by for example opening a pilot testing application on the user device and selecting the software program(s) for which pilot testing should be done. This may occur in instances where the administrator becomes aware of new software and/or updates to the existing software that the administrator or other personnel decide would be beneficial for the organization to utilize. For example, it may occur by receiving an automatic software upgrade notification from one or more software programs run one or more hardware assets of the IT system. The pilot testing application may be a part of software management tools available to the administrator. Furthermore, the IT administrator may become aware of and/or select a software update program (e.g. software upgrade version) through available software management tools. In one implementation, receiving a request to perform pilot testing of one or more software programs may involve the IT administrator selecting new software and/or updates to the existing software through software management tools and then choosing to run a pilot validation on the selected software via a pilot testing application.

In some cases, the request to perform pilot testing on one or more software programs may be received from one or more other local or remote computing devices. For example, a pilot testing application run remotely from a cloud may send a request to the pilot testing application of the IT system to run pilot tests on one or more suggested software programs. In one implementation, the pilot testing application may include an option for selecting whether or not to allow automatic performance of pilot tests. For example, a user of the pilot testing application may be able to click on a button to enable automatic pilot tests.

After receiving the request to initiate pilot testing, method 200 may proceed to enable selection of important software assets in the organization, at 210. This is because a pilot test that is run on a limited number of hardware assets may not cover all the software assets installed in the hardware assets, and some of the critical software assets important to the organization's success may not be included in a pool of the hardware assets selected for validation. Hence, in some cases, the pilot testing may be performed without testing software assets that are not compatible with the update and as such cannot be validated for the update. This failure to identify and validate critical software assets may cause the software assets and hardware assets to malfunction or even crash once a full-scale rollout is completed, which could interrupt business operations of the organization for an extended period of time. To prevent this, method 200 employs technology that enables selection of important software assets. This may involve implementing unique hardware-based methodology for presenting a list of software assets to the administrator through a user interface screen of the pilot testing application and/or software management tools and allowing the administrator to manually select the ones that are important to any pilot testing and/or the particular pilot testing being done. Alternatively, the process of selecting the important software assets with which compatibility should be tested may be performed automatically through an asset recommendation system which may operate as discussed in the co-pending patent application Ser. No. 16/183,708, filed on Nov. 7, 2018 and entitled "Intelligent Software Asset Classification for Software Update Validation," the entirety of which is incorporated by reference herein. In one implementation, the administrator can choose whether to select the important software assets or to allow the application to choose them. Alternatively, a combination of both may be performed. For example, the application may run to select important software assets automatically, present the results to the administrator, and then allow the administrator to remove some of the selected software assets and/or add other ones.

Once important software assets have been selected, method 200 may proceed to select a number of hardware assets on which the pilot test should be performed, at 215. This may be done manually, by presenting a user interface screen to the administrator through which the administrator can select the eligible devices on which the pilot test should be performed. Alternatively, the selection may be done automatically on a random basis. For example, the application may obtain a list of the organization's hardware assets and randomly select a specific number of those hardware assets on which the pilot test should be run. In yet another alternative, the subset of hardware assets may be selected through a hardware asset recommendation system such as the one described in the co-pending patent application Ser. No. 16/035,634, filed on Jul. 14, 2018 and entitled "Intelligent Device Selection for Pilot Testing," the entirety of which is incorporated by reference herein.

After the important software assets and the hardware assets upon which the pilot test is to run are selected, method 200 may proceed to configure one or more metric parameters for the pilot test. FIG. 4 illustrates example metric parameters upon which pilot testing of a software program can be measured. These metrics may include one or more of system health metrics 410, usage 420, customer sentiment 430, and performance 440, among others.

System health metrics 410 may include sudden exits (e.g., ungraceful program exits) such as when the user suddenly exits an application even though he/she is in the middle of performing a task. Such an exit may be an indication of user frustration and/or a problem with the program causing a sudden exit. As a result, such sudden exists may provide an indication of the software program's performance and/or user's satisfaction with the program. System health metrics may also include data relating to exact crash stack collected by the software program or any other third-party program that collects such data. Exact crash stack may show the exact line of code in a program that causes the crash. By collecting this information, the pilot testing application may determine if a line of code is implicated in causing repeated crashes and how that may affect compatibility of the software program being tested with the other software and/or hardware assets. In one implementation, system health metrics 410 may also include product reliability related signals and commands such as events and activities (e.g., pieces of code instrumentation) that relate to or provide indications of product reliability. Together, data related to sudden exits, exact crash stack and product reliability may provide a good indication of a system's health.

Usage data 420 may include parameters such as engagement time, number of collaborations, number of files accessed and number of clicks. The engagement time may track the amount of time spent on one or more applications. For example, it may track the amount of time spent on the software program being tested and/or one or more of the important software assets identified at step 210 of method 200 of FIG. 2. This may be important because if during the testing period one or more of the important software assets are not used for a sufficient time period, the data collected may not represent any potential incompatibility issues between the important software assets and the software program being tested. Number of collaborations with other users, number of files accessed, and number of clicks may provide other indications for whether or not the software program being tested and/or the important software assets were used for a sufficient amount of time.

Customer sentiment 430 may provide another set of metric parameters by which a pilot test can be measured. Customer sentiment 430 may include parameters such as a net promotor score (NPS), emoticon use, survey results, and customer feelings. The net promotor score may be obtained by asking one or more users to provide a rating (e.g., a score) for the software program being tested. Emoticon use may be determined by examining whether the user has chosen to press one or more emoticons available in the software program. For example, the program may include a smile emoticon on a toolbar that the user can press to send a smile. Emoticon use may also be examined in any comments the user makes in one or more survey responses. Survey responses may be obtained via one or more surveys presented to the one or more of the users utilizing the software program. For example, the pilot testing application may periodically present a survey to each of the users to ask their opinions about the software program being tested. The survey responses may be analyzed to extract verbatim metrics and sentiments based on responses and comments. This may be done through one or more techniques known in the art that convert sentences into sentiment metrics. Customer feeling metrics may be determined based on one or more of use of emoticons, use of certain words and phrases, and various other techniques known in the art.

Performance metrics 440 may include parameters such as time to complete action and response time. This may include for example tracking the amount of time it takes a user to complete one or more actions in the software program being tested and/or any of the other important software assets. The amount of time may be indicative of usability and compatibility issues. The response time may also be tracked to examine the amount of time it takes a software and/or hardware asset to process a request (e.g., an action in a program) and provide a response.

These metrics provide in-depth data about the functions of the software programs being tested and/or its compatibility with other important software assets. By collecting an analyzing this data, the pilot testing application may be able to determine automatically whether or not the software program being tested passes the pilot test.

Referring back to FIG. 2, configuring the metric parameters at step 220 may involve selecting which one of the numerous potential metric parameters should be tracked for the pilot test. This may be done by enabling the administrator to select the required metric parameters or automatically by the pilot testing application. For example, the pilot testing application may choose the metric parameters based on data available about the software program being tested, any known bugs or compatibility issues of the software program and/or any available information about the organization and its software and/or hardware assets.

Once the metric parameters are selected, method 200 may proceed to configure a baseline target population against which the collected data should be compared, at 225. The size and characteristics of the target population may depend on a variety of factors including but not limited to the stage of pilot testing of the software program being tested. This is because when a software program is first tested, there is a limited amount of data available to compare the test results to. However, as more of the software program is tested, more options (e.g., target populations) become available to select from. Target populations may include pre-pilot users, who may be early adaptors (e.g., enthusiastic users) of the software program within the same organization. These may be users who decided to use the software program before any pilot testing was run. This target population may be selected when it is the first time a pilot test is being run on the software program. Alternatively, in instances where the software program is being tested/deployed in multiple phases, the target population may include one or more of the previous pilot users.

In one implementation, the target population may include users outside of the organization. This may be a good option, for example, when the organization is too small to provide a good target comparison population or when it is the first time the software program is being tested within the organization and there are not enough pre-pilot users. Alternatively, the administrator or pilot testing application may simply determine that a remote target population can provide a better target population for comparison. The remote target population may be a target population of organizations that are similar in one or more ways to the organization conducting the pilot test. This may be achieved through collaborative filtering which may determine a list of organizations that satisfy one or more conditions and have decided to contribute as collaborative users. For example, organizations may be categorized by industry, organization size, type of assets, and the like. Additionally, the remote target population may include all organizations that have used and/or pilot tested the software program being tested for which the test data is stored and available in a cloud storage database accessible to the pilot testing application.

In instances where a global target population is not available and/or is not appropriate for various reasons and a local target population is also not available (e.g., it is the first time the software program is being run in the organization), a target population may not be selected at this stage. In such a case, the pilot testing application may simply analyze the metric data collected based on one or more thresholds.

The target population may be selected by the pilot testing application automatically based on one or more factors such as data relating to previous pilot tests of the software program or may be chosen by an administrator via for example a user interface screen of the pilot testing application.

After the appropriate target population is selected, method 200 may proceed to configure other parameters for the pilot test, at 230. These parameters may include a statistical methodology for analyzing the collected data, tolerance levels for one or more of the metric parameters, and a minimum number of devices and/or sessions. The statistical methodology may include one or more methods for processing the collected data. These methods may include parametric approaches (e.g., t-test, prop-test), non-parametric approaches and anomaly detection approaches (e.g., to determine if pilot test needs to be stopped), among others. In one implementation, a combination of two or more of these methods may be selected and used. The method of statistical analysis may be selected by the administrator or automatically chosen by the application based on several factors. Tolerance levels for one or more of the metric parameters may also be set at this stage. This may involve selection minimum and/or maximum thresholds for one or more of the metric parameters. For example, 1% may be set as the maximum acceptable threshold for system health metric parameters such as sudden exits. In such a case, a 1% rate sudden exits from among normal exits may be identified as acceptable for the software program and/or other important software programs during pilot testing, while rates above 1% may be flagged as problematic. Similarly, a maximum time period, for example 3 milliseconds may be set as the maximum acceptable time for performance related metrics such as time to complete action and response time. The tolerance levels may be set by the administrator or set automatically by the program based on various factors such as parameters specific to the software program being tested.

In one implementation, configuring additional parameters at step 230 may also include determining a minimum number of devices, sessions, and/or amount of usage needed for running the pilot test to collect sufficient data. This may be performed automatically by the pilot testing application. For example, the number of devices chosen to perform the pilot test on may be determined automatically by the hardware asset recommendation system as part of selecting the hardware assets of step 210. The number of sessions and the amount of usage may also be determined automatically based on known characteristics of the software program being tested or history data related to other pilot tests. For example, the pilot testing application may consult a database of other pilot tests conducted in the organization to determine a minimum amount of time other pilot tests were performed for before issues were detected.

Alternatively, the administrator may have the ability to select these parameters. Once all required additional parameters are configured by the application and/or the administrator, method 200 proceeds to being pilot testing of the software program, at 235.

Figure 3A:
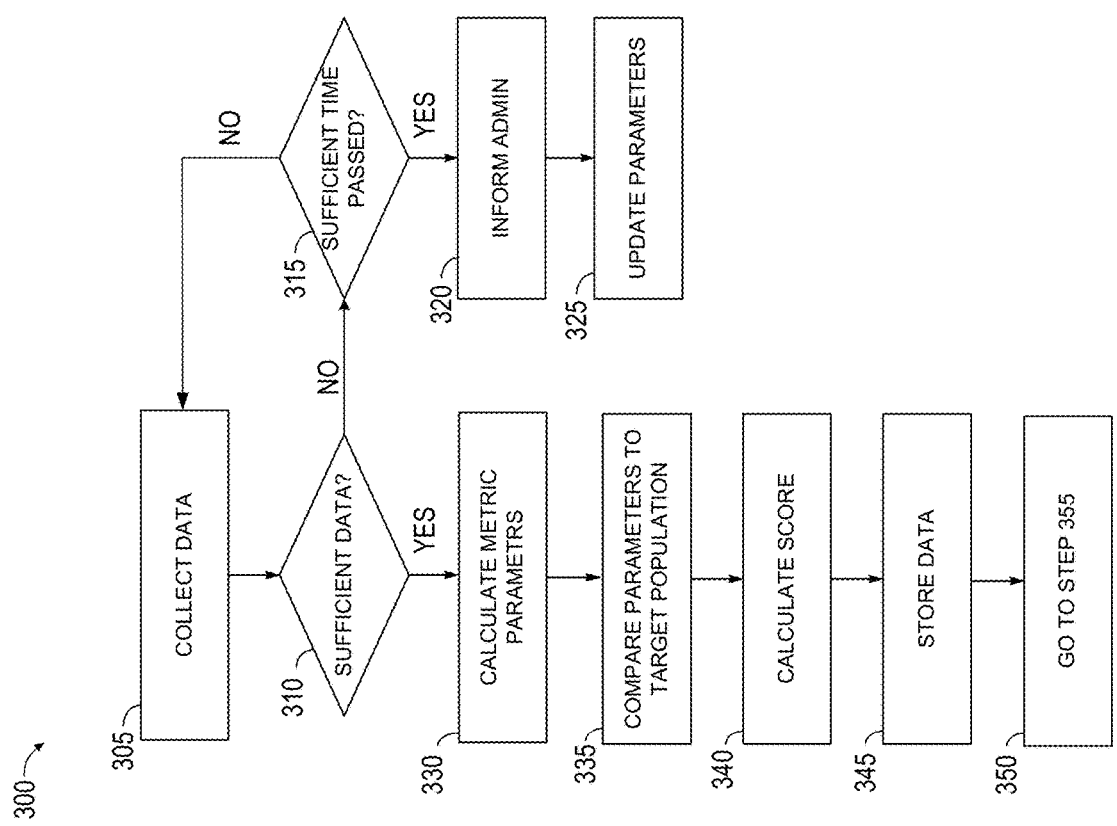
FIGS. 3A-3B are a flow diagram showing an example method for an improved process of performing pilot testing of software in an organization.
Figure 3B:
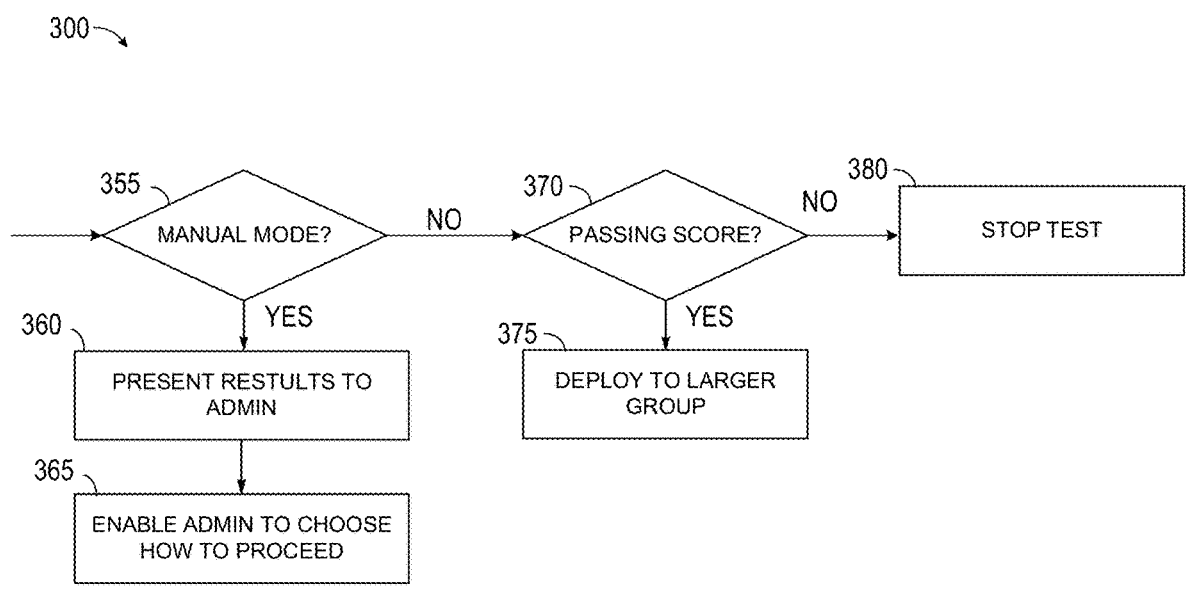

FIGS. 3A-3B depict a flow diagram showing an example method 300 for an improved process of performing pilot testing of new and updated software in an organization. At 305, the method 300 begins by collecting data for one or more metric parameters selected for performing pilot testing on the software program being tested. Once collection of data begins, method 300 proceeds to determine, at step 310, whether sufficient data has been collected to make a determination. This may be done by utilizing sampling-based approaches known in the art or by determining if the amount of data collected meets predetermined thresholds such as those configured during step 230 of method 200 (e.g., number of sessions, and/or amount of usage).

When it is determined that sufficient data has not been yet collected, method 300 proceeds to determine, at 315, whether sufficient time has passed. The amount of sufficient time may be a maximum amount of time allotted for performing the pilot test. This may be predetermined by the pilot testing application or it may be set by the administer. For example, the application and/or administrator may determine that 10 days is the maximum amount of time needed to run a pilot test on the software program being tested, and may set this amount, for example at step 230 of method 200. Then, method 300 may determine, at 315, whether or not 10 days has passed since the beginning of pilot testing to decide whether the test should continue or should be stopped. Determining whether a sufficient amount of time has passed may be done automatically by the pilot testing application or it may be done manually by the administrator. When it is determined that sufficient time has not passed, method 300 may return to step 305 to collect more data. However, when it is determined that sufficient time has been spent on the pilot test, method 300 may proceed to inform the administrator, at 320. This is because of an amount of time determined to be sufficient for collecting data has passed since the pilot testing began and yet the amount of data collected is not adequate, there may be a problem either with the metric parameters configured during the steps of the method 200 or with one or more of the selected hardware and/or software assets. At this stage, an administrator may be needed to examine the selected parameters to determine the cause of the issue. Once the causes of the problem have been identified, the steps of method 200 may be repeated to, for example, update one or more parameters, at 325, before restarting the pilot test.

Once it is determined, at 310, that sufficient data has been collected, the metrics parameters of the data collected may be calculated, at 330, before being compared to the same metric parameters of the target population selected for the pilot test, at 335. For example, the number of sudden exits that occurred during the pilot testing may be compared to the number of sudden exits that occurred for the target population to determine if the number is above or below the target population. A score may then be calculated, at 340, for each metric parameter based on the comparison. In one implementation, an overall score may also be calculated based on the individual metric scores. The one or more scores may be calculated based on a regression analysis or any other methods of statistical modeling. For example, one way to calculate the score is to determine how far a metric parameter such as, crash ratio, deviates from the target population (as configured) based on the tolerance and other configured parameters. This may yield a standardized score per metric parameter. A deviation score may then be calculated for one or more of the metric parameters to obtain an overall regression score for a particular software asset. There are many known techniques for calculating the deviation scores. For example, one way to calculate a deviation or regression score is to normalize a metric parameter by mean and divide it by the standard deviation. This means, that the method can determine a metric parameter such as crash ratio is for example 1 deviations apart from normal, while a different metric parameter such as customer sentiment is −1 deviation apart from normal and the like. All the deviations can then be combined by weighting how important each metric parameter is for an enterprise. For example, performance may be very important to web companies. As a result, performance deviations may have higher weights then customer feedback for web companies.

The calculated scores along with their underlying data may then be store, at 345, for future access and use. At least some of the data may be stored locally, for example, in a server or user device of the organization. Additionally, the data may be stored remotely in a datastore in the cloud. For example, the data may be stored in a datastore related to pilot testing of various software programs, such that the collected data may be used in training machine learning models and performing future pilot testing in the same or different organizations.

After storing the data, method 300 may proceed to step 355 of FIG. 3B, at 350. At this stage, method 300 may determine if a manual mode has been selected for the pilot testing, at 355. The manual mode may have been selected, for example, when an administrator chose to review the results of the pilot testing before any other actions are taken. The manual mode may be selected automatically based on one or more specific conditions of the pilot test or the software program being tested, or it may be chosen by a user. When it is determined that the manual mode is on, method 300 may proceed to present the results to one or more administrators, at 360. This may involve notifying the administrators that the pilot test is done, by for example, presenting a pop-up screen on their user interface, sending them an email, a text message or any other notification method. After receiving the notification, once the administrator has returned to the pilot testing application, a screen may be presented to them with the results of the pilot test. The results may include the overall score, one or more of the metric parameter scores, and one or more of the configured parameters. In one implementation, the results shown may be customizable. For example, the administrator may select which results he/she wishes to review. The administrator may also be able to select particular results to review specific data relating to the results. For example, by clicking on a metric parameter relating to the usage, the administrator may be able to review the underlying data.

In addition, to presenting the results to the administrator, method 300 may also enable the administrator to choose how to proceed based on the results, at 365. For example, the administrator may choose to expand the pilot test to a larger group, upon which method 300 may return to step 205 of method 200, or the administrator may choose to deploy the software program to the entire organization. Alternatively, when the results are not satisfactory, the administrator may choose to stop pilot testing, in which case, he/she may choose to uninstall the software program from the devices on which it was installed or revert back to a previous version of the software program.

When it is determined, at 355, that the manual mode is not selected (e.g., autopilot is on), method 300 may proceed to determine, at 370, if the pilot test acquired a passing score. This may be done by examining the overall score to determine if it is above a specific threshold. When it is determined that the pilot test has receiving a passing score, method 300 may proceed to automatically deploy the software program to a larger group, at 375, in which case, the process may return to step 205 of method 200 for expanding the pilot testing to a larger group. Alternatively, method 300 may determine at this stage, that the results were satisfactory enough or the pilot testing is in a sufficiently advanced stage, to deploy the software program to the entire organization. The parameters based on which this decision is made may be set automatically or may be chosen by the administrator. For example, it may be set that when the regression score is above a certain threshold, the program may be deployed to the entire organization.

When it is determined, at 370, that the pilot test did not achieve a passing score, method 300 may automatically proceed to stop pilot testing the software program, at 380. In one implementation, the administrator may also be notified at this stage to decide how to further proceed. This may involve uninstalling the software program from the hardware assets or reverting back to a previous version.

FIG. 5 depicts an example decision tree 500 for deciding how to proceed once or more metric parameters have been calculated for a pilot test. The metric parameters examined for the decision tree 500 included session crash and device crash metrics. Session crash parameters may relate to data identifying the number of crashed sessions, while the device crash metrics may relate to data identifying the number of crashed devices (e.g., hardware assets). The decision tree 500 illustrates situations in which even though the total collected data may be determined as being sufficient, insufficient data has been collected for one or more particular metric parameters. For example, as shown in the first row of the decision tree 500, insufficient data has been collected for session crash metrics. When it is determined that the session crash metrics data collected is insufficient, the decision tree may examine the other collected data, which in this case includes device crash metrics. If the collected device crash metrics data is also insufficient, then the decision tree may indicate decide that the amount of data is insufficient to make a determination. When, however, the device crash metrics indicate a healthy system (e.g., a low number of device crashes), then the decision tree may determine that pilot testing receives a passing score based on the examined metrics. On the other hand, when the device crash metrics indicate regression (e.g., a high number of device crashes), then the decision tree may decide that the amount of data collected is not sufficient to make a determination.

On the other hand, when the session crash metrics indicate a healthy system (e.g., a low number of session crashes), insufficient device crash metrics and positive device crash metrics may result in a passing score determination, while regression device crash metrics may result in informing the administrator as the two metrics have produced opposing results. In this case, a manual review may be required.

When the session crash metrics indicate regression, insufficient device crash metrics may result in a determination of insufficient data, while healthy device crash metrics may result in informing the administrator. When both session crash metrics and device crash metrics indicate regression, the decision tree may determine that the pilot test receives a failed score.

It should be noted that the models configuring one or more parameters, calculating the parameters, comparing the parameters to target populations, and calculating scores may be hosted locally on or more assets of the organization (e.g., a local server or administrator's device) or may be stored remotely in the cloud. In one implementation, some models are hosted locally, while others are stored in the cloud. This enables the organization to perform pilot testing even when the local device hosting the pilot testing application is not connected to an external network. For example, the pilot testing application may be able to run a pilot test and compare the results to a local target population, but it may not be able to compare the results to any groups outside of the organization. Once the client connects the network, however, the application may be able to provide better and more complete analysis and better recommendations.

Figure 6:
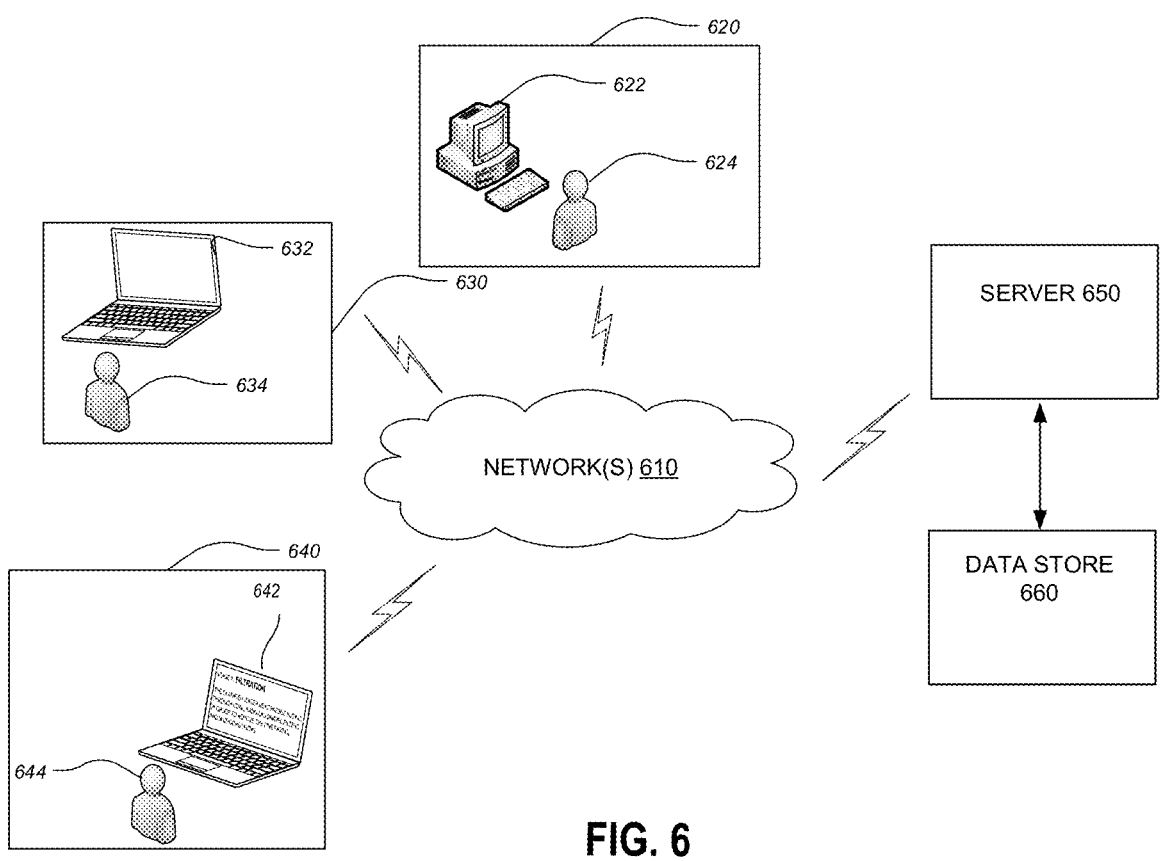
FIG. 6 illustrates a representative environment for performing pilot testing of software programs.

FIG. 6 illustrates a representative global environment for enabling pilot testing of software programs. In different implementations, the environment can include a plurality of organizations, such as organizations 620, 630 and 640 each of which may include at least one administrator such as administrator 624 utilizing a device 622, administrator 634 utilizing device 632, and administrator 644 utilizing a device 642. As each organization performs pilot testing of one or more software programs, data collected during the pilot tests and associated calculations may be transmitted to a server 650 via one or more networks which may in turn transmit the data to a data store 660 for storage. The pilot testing data may be transmitted in batches at different times. For example, the testing data may be stored locally on one or more devices in each organization and transmitted each time a pilot test of a particular software program is finished.

As a general matter, the methods and systems described herein may include, or otherwise make use of, a machine-trained model to determine how to select software and hardware assets, how to configure various test parameters, whether sufficient data has been collected or sufficient time has passed, how to calculate metric parameters, how to calculate one or more scores, and how to proceed based on the calculated score. As an example, a system can be trained using data generated by machine learning (ML) model in order to choose appropriate parameters and their associated thresholds for collecting data in a pilot test of a particular software program. Such selection may be made following the accumulation, review, and/or analysis of pilot testing data collected from a large number of users in various organizations over time, that may be configured to provide the ML algorithm (MLA) with an initial or ongoing training set. As a general example, a number of command events used to serve as a baseline for training can range from 20 to over 1,000,000. In addition, in some implementations, a device on which a pilot testing application is running can be configured to transmit data captured locally during pilot testing of a software program to the cloud or the local ML program and provide supplemental training data that can serve to fine-tune or increase the effectiveness of the MLA. The supplemental data can also be used to facilitate identification of appropriate parameters and/or to increase the training set for future pilot tests.

In different implementations, a training system may be used that includes an initial ML model (which may be referred to as an "ML model trainer") configured to generate a subsequent trained ML model from training data obtained from a training data repository or from device-generated data. The generation of this ML model may be referred to as "training" or "learning." The training system may include and/or have access to substantial computation resources for training, such as a cloud, including many computer server systems adapted for machine learning training. In some implementations, the ML model trainer is configured to automatically generate multiple different ML models from the same or similar training data for comparison. For example, different underlying ML algorithms may be trained, such as, but not limited to, decision trees, random decision forests, neural networks, deep learning (for example, convolutional neural networks), support vector machines, regression (for example, support vector regression, Bayesian linear regression, or Gaussian process regression). As another example, a size or complexity of a model may be varied between different ML models, such as a maximum depth for decision trees, or a number and/or size of hidden layers in a convolutional neural network. As another example, different training approaches may be used for training different ML models, such as, but not limited to, selection of training, validation, and test sets of training data, ordering and/or weighting of training data items, or numbers of training iterations. One or more of the resulting multiple trained ML models may be selected based on factors such as, but not limited to, accuracy, computational efficiency, and/or power efficiency. In some implementations, a single trained ML model may be produced.

In some implementations, the ML models and/or their corresponding classification systems can be configured to use, among other things, machine learning and inference techniques to patterns in collected test data, determine associations between various test parameters and program performance, and/or identify suggested approaches for processing the results. In some implementations, machine learning techniques may generate one or more models for identifying and/or characterizing events based on a corpus of training data in the form of labeled or otherwise previously characterized data. Furthermore, the training data may be continually updated and one or more of the models used by the classification system can be revised or regenerated to reflect the updates to the training data. Over time, the training system (whether stored remotely, locally, or both) can be configured to receive and accumulate more and more training data items, thereby increasing the amount and variety of training data available for ML model training, resulting in increased accuracy, effectiveness, and robustness of trained ML models.

Various ML algorithms and techniques for training ML models are discussed in U.S. Patent Application Publication Numbers 2013/0346346 (published on Dec. 26, 2013 and entitled "Semi-Supervised Random Decision Forests for Machine Learning"), 2014/0122381 (published on May 1, 2014 and entitled "Decision Tree Training in Machine Learning"), 2014/0172753 (published on Jun. 19, 2014 and entitled "Resource Allocation for Machine Learning"), 2015/0248764 (published on Sep. 3, 2015 and entitled "Depth Sensing Using an Infrared Camera"), 2015/0248765 (published on Sep. 3, 2015 and entitled "Depth Sensing Using an RGB Camera"), 2017/0132496 (published on May 11, 2017 and entitled "Hardware-Efficient Deep Convolutional Neural Networks"), 2017/0206431 (published on Jul. 20, 2017 and entitled "Object Detection and Classification in Images"), 2017/0236286 (published on Aug. 17, 2017 and entitled "Determining Depth from Structured Light Using Trained Classifiers"), U.S. patent application Ser. No. 15/870,783 (filed on Jan. 12, 2018 and entitled "Automated Collection of Machine Learning Data"), and 2017/0262768 (published on Sep. 14, 2017 and entitled "Depth from Time-of-Flight Using Machine Learning"), which are each incorporated by reference herein in their entireties.

Thus, in different implementations, one or more machine learning models can be developed that re configured to select software and hardware assets, configure various test parameters, determine if sufficient data has been collected or sufficient time has passed, calculate metric parameters, calculate one or more scores, and determine how to proceed based on the calculated score. In some implementations, the ML model can obtain reinforcement signals to improve the model and better account for user intentions. As a preliminary modeling paradigm, some implementations can make use of one or more bootstrapping algorithms to provide approximations of these predictions.

Figure 7:
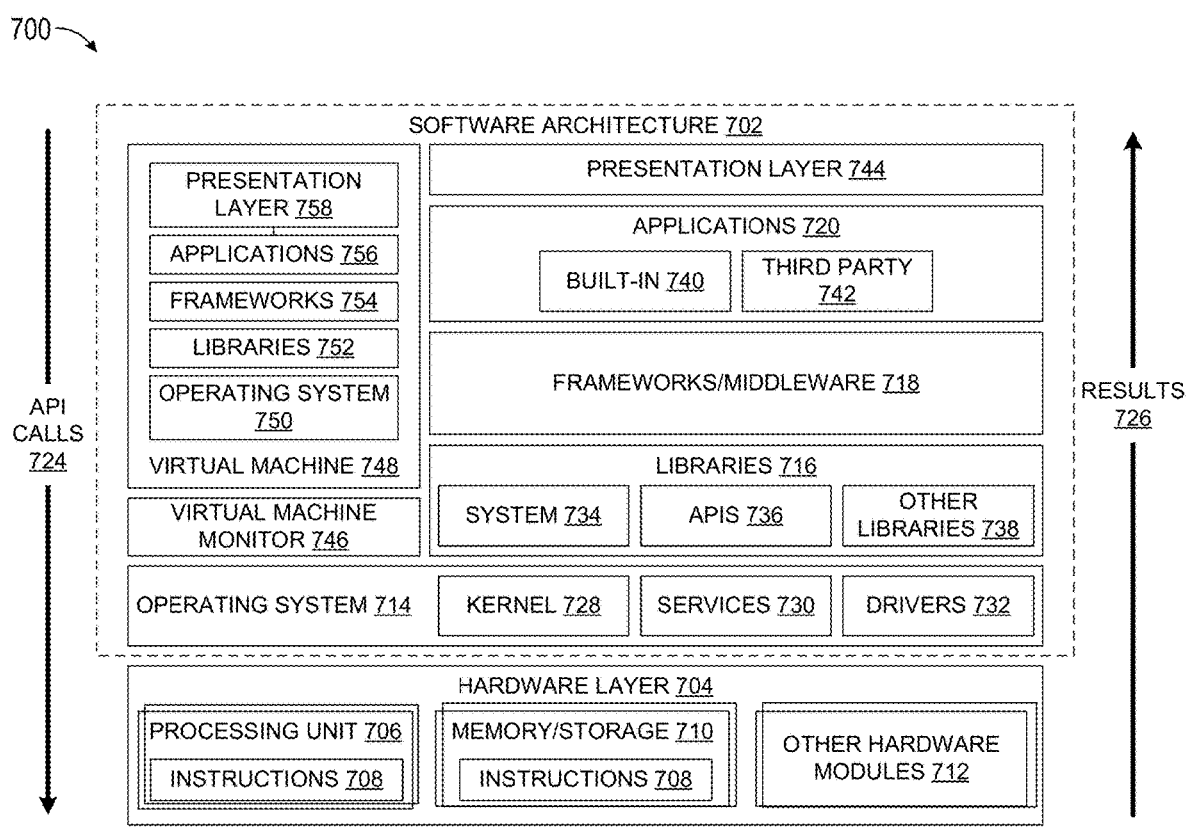
FIG. 7 is a block diagram illustrating an example software architecture, various portions of which may be used in conjunction with various hardware architectures herein described.

FIG. 7 is a block diagram 700 illustrating an example software architecture 702, various portions of which may be used in conjunction with various hardware architectures herein described, which may implement any of the above-described features. FIG. 7 is a non-limiting example of a software architecture and it will be appreciated that many other architectures may be implemented to facilitate the functionality described herein. The software architecture 702 may execute on hardware such as client devices, native application provider, web servers, server clusters, external services, and other servers. A representative hardware layer 704 includes a processing unit 706 and associated executable instructions 708. The executable instructions 708 represent executable instructions of the software architecture 702, including implementation of the methods, modules and so forth described herein.

The hardware layer 704 also includes a memory/storage 710, which also includes the executable instructions 708 and accompanying data. The hardware layer 704 may also include other hardware modules 712. Instructions 708 held by processing unit 708 may be portions of instructions 708 held by the memory/storage 710.

The example software architecture 702 may be conceptualized as layers, each providing various functionality. For example, the software architecture 702 may include layers and components such as an operating system (OS) 714, libraries 716, frameworks 718, applications 720, and a presentation layer 724. Operationally, the applications 720 and/or other components within the layers may invoke API calls 724 to other layers and receive corresponding results 726. The layers illustrated are representative in nature and other software architectures may include additional or different layers. For example, some mobile or special purpose operating systems may not provide the frameworks/middleware 718.

The OS 714 may manage hardware resources and provide common services. The OS 714 may include, for example, a kernel 728, services 730, and drivers 732. The kernel 728 may act as an abstraction layer between the hardware layer 704 and other software layers. For example, the kernel 728 may be responsible for memory management, processor management (for example, scheduling), component management, networking, security settings, and so on. The services 730 may provide other common services for the other software layers. The drivers 732 may be responsible for controlling or interfacing with the underlying hardware layer 704. For instance, the drivers 732 may include display drivers, camera drivers, memory/storage drivers, peripheral device drivers (for example, via Universal Serial Bus (USB)), network and/or wireless communication drivers, audio drivers, and so forth depending on the hardware and/or software configuration.

The libraries 716 may provide a common infrastructure that may be used by the applications 720 and/or other components and/or layers. The libraries 716 typically provide functionality for use by other software modules to perform tasks, rather than rather than interacting directly with the OS 714. The libraries 716 may include system libraries 734 (for example, C standard library) that may provide functions such as memory allocation, string manipulation, file operations. In addition, the libraries 716 may include API libraries 736 such as media libraries (for example, supporting presentation and manipulation of image, sound, and/or video data formats), graphics libraries (for example, an OpenGL library for rendering 2D and 3D graphics on a display), database libraries (for example, SQLite or other relational database functions), and web libraries (for example, WebKit that may provide web browsing functionality). The libraries 716 may also include a wide variety of other libraries 738 to provide many functions for applications 720 and other software modules.

The frameworks 718 (also sometimes referred to as middleware) provide a higher-level common infrastructure that may be used by the applications 720 and/or other software modules. For example, the frameworks 718 may provide various GUI functions, high-level resource management, or high-level location services. The frameworks 718 may provide a broad spectrum of other APIs for applications 720 and/or other software modules.

The applications 720 include built-in applications 720 and/or third-party applications 722. Examples of built-in applications 720 may include, but are not limited to, a contacts application, a browser application, a location application, a media application, a messaging application, and/or a game application. Third-party applications 722 may include any applications developed by an entity other than the vendor of the particular system. The applications 720 may use functions available via OS 714, libraries 716, frameworks 718, and presentation layer 724 to create user interfaces to interact with users.

Some software architectures use virtual machines, as illustrated by a virtual machine 728. The virtual machine 728 provides an execution environment where applications/modules can execute as if they were executing on a hardware machine (such as the machine 800 of FIG. 8, for example). The virtual machine 728 may be hosted by a host OS (for example, OS 714) or hypervisor, and may have a virtual machine monitor 726 which manages operation of the virtual machine 728 and interoperation with the host operating system. A software architecture, which may be different from software architecture 702 outside of the virtual machine, executes within the virtual machine 728 such as an OS 750, libraries 752, frameworks 754, applications 756, and/or a presentation layer 758.

Figure 8:
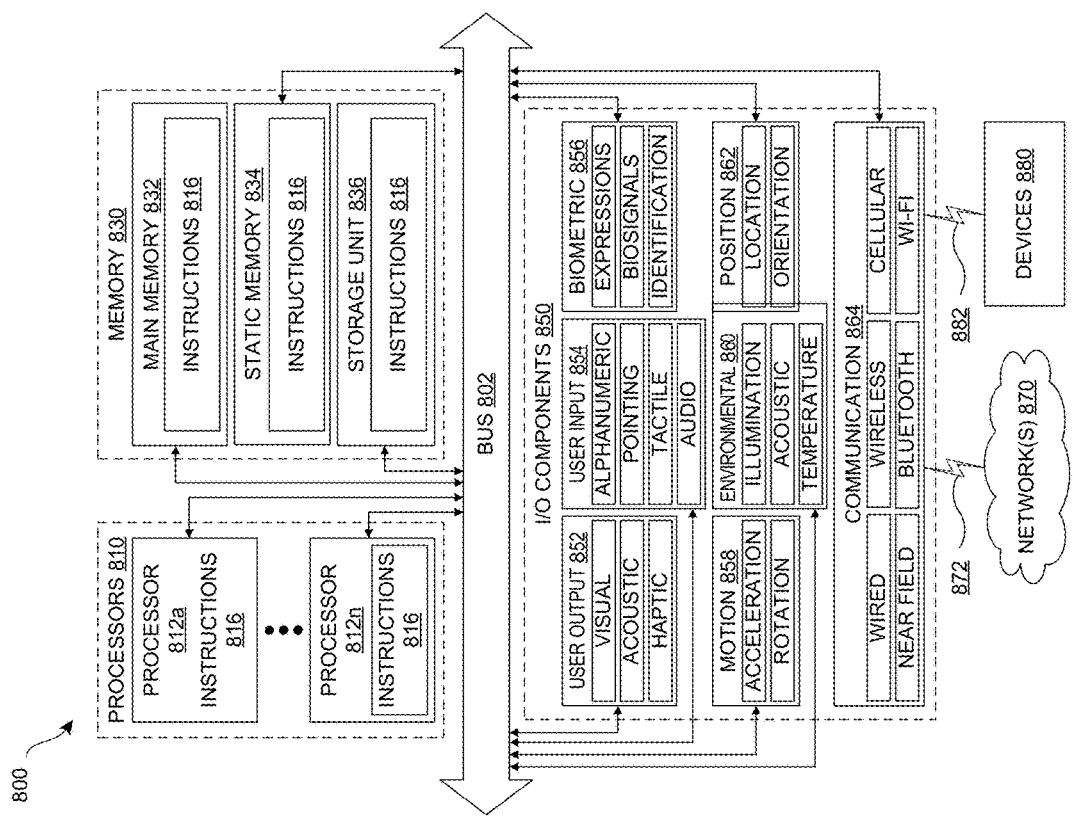
FIG. 8 is a block diagram illustrating components of an example machine configured to read instructions from a machine-readable medium and perform any of the features described herein.

FIG. 8 is a block diagram illustrating components of an example machine 800 configured to read instructions from a machine-readable medium (for example, a machine-readable storage medium) and perform any of the features described herein. The example machine 800 is in a form of a computer system, within which instructions 816 (for example, in the form of software components) for causing the machine 800 to perform any of the features described herein may be executed. As such, the instructions 816 may be used to implement methods or components described herein. The instructions 816 cause unprogrammed and/or unconfigured machine 800 to operate as a particular machine configured to carry out the described features. The machine 800 may be configured to operate as a standalone device or may be coupled (for example, networked) to other machines. In a networked deployment, the machine 800 may operate in the capacity of a server machine or a client machine in a server-client network environment, or as a node in a peer-to-peer or distributed network environment. Machine 800 may be embodied as, for example, a server computer, a client computer, a personal computer (PC), a tablet computer, a laptop computer, a netbook, a set-top box (STB), a gaming and/or entertainment system, a smart phone, a mobile device, a wearable device (for example, a smart watch), and an Internet of Things (IoT) device. Further, although only a single machine 800 is illustrated, the term "machine" include a collection of machines that individually or jointly execute the instructions 816.

The machine 800 may include processors 810, memory 830, and I/O components 850, which may be communicatively coupled via, for example, a bus 802. The bus 802 may include multiple buses coupling various elements of machine 800 via various bus technologies and protocols. In an example, the processors 810 (including, for example, a central processing unit (CPU), a graphics processing unit (GPU), a digital signal processor (DSP), an ASIC, or a suitable combination thereof) may include one or more processors 812a to 812n that may execute the instructions 816 and process data. In some examples, one or more processors 810 may execute instructions provided or identified by one or more other processors 810. The term "processor" includes a multi-core processor including cores that may execute instructions contemporaneously. Although FIG. 8 shows multiple processors, the machine 800 may include a single processor with a single core, a single processor with multiple cores (for example, a multi-core processor), multiple processors each with a single core, multiple processors each with multiple cores, or any combination thereof. In some examples, the machine 800 may include multiple processors distributed among multiple machines.

The memory/storage 830 may include a main memory 832, a static memory 834, or other memory, and a storage unit 836, both accessible to the processors 810 such as via the bus 802. The storage unit 836 and memory 832, 834 store instructions 816 embodying any one or more of the functions described herein. The memory/storage 830 may also store temporary, intermediate, and/or long-term data for processors 810. The instructions 916 may also reside, completely or partially, within the memory 832, 834, within the storage unit 836, within at least one of the processors 810 (for example, within a command buffer or cache memory), within memory at least one of I/O components 850, or any suitable combination thereof, during execution thereof. Accordingly, the memory 832, 834, the storage unit 836, memory in processors 810, and memory in I/O components 850 are examples of machine-readable media.

As used herein, "machine-readable medium" refers to a device able to temporarily or permanently store instructions and data that cause machine 800 to operate in a specific fashion. The term "machine-readable medium," as used herein, does not encompass transitory electrical or electromagnetic signals per se (such as on a carrier wave propagating through a medium); the term "machine-readable medium" may therefore be considered tangible and non-transitory. Non-limiting examples of a non-transitory, tangible machine-readable medium may include, but are not limited to, nonvolatile memory (such as flash memory or read-only memory (ROM)), volatile memory (such as a static random-access memory (RAM) or a dynamic RAM), buffer memory, cache memory, optical storage media, magnetic storage media and devices, network-accessible or cloud storage, other types of storage, and/or any suitable combination thereof. The term "machine-readable medium" applies to a single medium, or combination of multiple media, used to store instructions (for example, instructions 816) for execution by a machine 800 such that the instructions, when executed by one or more processors 810 of the machine 800, cause the machine 800 to perform and one or more of the features described herein. Accordingly, a "machine-readable medium" may refer to a single storage device, as well as "cloud-based" storage systems or storage networks that include multiple storage apparatus or devices.

The I/O components 850 may include a wide variety of hardware components adapted to receive input, provide output, produce output, transmit information, exchange information, capture measurements, and so on. The specific I/O components 850 included in a particular machine will depend on the type and/or function of the machine. For example, mobile devices such as mobile phones may include a touch input device, whereas a headless server or IoT device may not include such a touch input device. The particular examples of I/O components illustrated in FIG. 8 are in no way limiting, and other types of components may be included in machine 800. The grouping of I/O components 850 are merely for simplifying this discussion, and the grouping is in no way limiting. In various examples, the I/O components 850 may include user output components 852 and user input components 854. User output components 852 may include, for example, display components for displaying information (for example, a liquid crystal display (LCD) or a projector), acoustic components (for example, speakers), haptic components (for example, a vibratory motor or force-feedback device), and/or other signal generators. User input components 854 may include, for example, alphanumeric input components (for example, a keyboard or a touch screen), pointing components (for example, a mouse device, a touchpad, or another pointing instrument), and/or tactile input components (for example, a physical button or a touch screen that provides location and/or force of touches or touch gestures) configured for receiving various user inputs, such as user commands and/or selections.

In some examples, the I/O components 850 may include biometric components 856 and/or position components 862, among a wide array of other environmental sensor components. The biometric components 856 may include, for example, components to detect body expressions (for example, facial expressions, vocal expressions, hand or body gestures, or eye tracking), measure biosignals (for example, heart rate or brain waves), and identify a person (for example, via voice-, retina-, and/or facial-based identification). The position components 862 may include, for example, location sensors (for example, a Global Position System (GPS) receiver), altitude sensors (for example, an air pressure sensor from which altitude may be derived), and/or orientation sensors (for example, magnetometers).

The I/O components 850 may include communication components 864, implementing a wide variety of technologies operable to couple the machine 800 to network(s) 970 and/or device(s) 880 via respective communicative couplings 872 and 882. The communication components 964 may include one or more network interface components or other suitable devices to interface with the network(s) 870. The communication components 864 may include, for example, components adapted to provide wired communication, wireless communication, cellular communication, Near Field Communication (NFC), Bluetooth communication, Wi-Fi, and/or communication via other modalities. The device(s) 880 may include other machines or various peripheral devices (for example, coupled via USB).

In some examples, the communication components 864 may detect identifiers or include components adapted to detect identifiers. For example, the communication components 864 may include Radio Frequency Identification (RFID) tag readers, NFC detectors, optical sensors (for example, one- or multi-dimensional bar codes, or other optical codes), and/or acoustic detectors (for example, microphones to identify tagged audio signals). In some examples, location information may be determined based on information from the communication components 862, such as, but not limited to, geo-location via Internet Protocol (IP) address, location via Wi-Fi, cellular, NFC, Bluetooth, or other wireless station identification and/or signal triangulation.

While various embodiments have been described, the description is intended to be exemplary, rather than limiting, and it is understood that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

Generally, functions described herein (for example, the features illustrated in FIGS. 1-7) can be implemented using software, firmware, hardware (for example, fixed logic, finite state machines, and/or other circuits), or a combination of these implementations. In the case of a software implementation, program code performs specified tasks when executed on a processor (for example, a CPU or CPUs). The program code can be stored in one or more machine-readable memory devices. The features of the techniques described herein are system-independent, meaning that the techniques may be implemented on a variety of computing systems having a variety of processors. For example, implementations may include an entity (for example, software) that causes hardware to perform operations, e.g., processors functional blocks, and so on. For example, a hardware device may include a machine-readable medium that may be configured to maintain instructions that cause the hardware device, including an operating system executed thereon and associated hardware, to perform operations. Thus, the instructions may function to configure an operating system and associated hardware to perform the operations and thereby configure or otherwise adapt a hardware device to perform functions described above. The instructions may be provided by the machine-readable medium through a variety of different configurations to hardware elements that execute the instructions.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows, and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein.

Relational terms such as first and second and the like may be used solely to distinguish one entity or action from another without necessarily requiring or implying any actual such relationship or order between such entities or actions. The terms "comprises," "comprising," and any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "a" or "an" does not, without further constraints, preclude the existence of additional identical elements in the process, method, article, or apparatus that comprises the element.

The Abstract of the Disclosure is provided to allow the reader to quickly identify the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that any claim requires more features than the claim expressly recites. Rather, as the following claims reflect, inventive subject matter lies in less than all features of a single disclosed example. Thus, the following claims are hereby incorporated into the Detailed Description, with each claim standing on its own as a separately claimed subject matter.

What is claimed is:

1. A device comprising:
   one or more processors; and
   a memory in communication with the one or more processors, the memory comprising executable instructions that, when executed by the one or more processors, cause the device to perform functions of:
      collecting pilot testing data generated from a pilot testing of a software program which is running on one or more hardware assets in an organization;
      determining whether an amount of the collected pilot testing data satisfies a predetermined threshold for evaluating the software program;
      upon determining that the amount of the collected pilot testing data satisfies the predetermined threshold for evaluating the software program, calculating a pilot test metric from the collected pilot testing data;
      comparing the calculated pilot testing metric with a corresponding metric in a target population;
      calculating a deviation score, the deviation score being an amount of difference between the calculated pilot testing metric and the corresponding metric;
      automatically evaluating the software program based on the calculated deviation score, wherein automatically evaluating the software program includes examining the deviation score to determine if the deviation score meets a threshold requirement; and
      automatically determining, at least in part, based on results of evaluating the software program, if the pilot testing of the software program should be extended to one or more other hardware assets of the organization or if the software program should be fully deployed in the organization.

2. The device of claim 1, wherein the executable instructions when executed by the one or more processors, further cause the device to perform functions of:
   receiving a request to perform the pilot testing;
   configuring one or more parameters for performing the pilot testing; and
   automatically determining, at least in part, based on results of evaluating the software program in the organization if the pilot testing should be stopped.

3. The device of claim 1, wherein the executable instructions, when executed by the one or more processors, further cause the device to perform functions of calculating a validation score for the pilot testing.

4. The device of claim 3, wherein the executable instructions, when executed by the one or more processors, further cause the device to perform functions of generating a validation pass or fail notification based at least in part on the validation score.

5. The device of claim 1, wherein the pilot test metric includes at least one of a system health metric, usage metric, customer sentiment metric and performance metric.

6. The device of claim 5, wherein calculating the pilot test metric includes:

determining the system health metric by calculating at least one of a number of sudden exists, a number of exact crash stack, and a product reliability indication;

determining the usage metric by calculating at least one of an engagement time, a number of collaborations, a number of files accessed, and a number of clicks;

determining the customer sentiment by calculating at least one of a net promotor score, emoticon use, a survey result, and a customer feeling indication; and determining the performance metric by calculating at least one of an amount of time to complete an action, and a response time.

7. The device of claim 1, wherein the target population comprises at least one of a pre-pilot testing population, a pilot testing population of one or more other organizations, and a global target population.

8. The device of claim 7, wherein the one or more other organizations are organizations in a similar industry as that of the organization.

9. The device of claim 1, wherein determining whether an amount of the collected pilot testing data satisfies the predetermined threshold for evaluating the software program includes determining if at least one of a minimum number of devices have participated in the pilot testing, the software program has run a minimum number of sessions or a minimum amount of usage time has passed.

10. The device of claim 1, wherein two or more deviation scores are combined and weighted to calculate an overall score.

11. The device of claim 1, wherein the deviation score is calculated by normalizing the pilot testing metric by a mean and dividing a normalized metric parameter by a standard deviation.

12. A method for performing pilot testing of a software program in an organization comprising:

collecting pilot testing data generated from the performing of the pilot testing of the software program on one or more hardware assets in the organization;

determining whether an amount of the collected pilot testing data satisfies a predetermined threshold for evaluating the software program;

upon determining that the amount of the collected pilot testing data satisfies the predetermined threshold for evaluating the software program, calculating a pilot test metric from the collected pilot testing data;

comparing the calculated pilot testing metric with a corresponding metric in a target population;

calculating a deviation score, the deviation score being an amount of difference between the calculated pilot testing metric and the corresponding metric;

automatically evaluating the software program based on the calculated deviation score, wherein automatically evaluating the software program includes examining the deviation score to determine if the deviation score meets a threshold requirement; and automatically determining, at least in part, based on results of evaluating the software program, if the pilot testing of the software program should be extended to one or more other hardware assets of the organization or if the software program should be fully deployed in the organization.

13. The method of claim 12, further comprising:

identifying one or more parameters to collect the pilot testing data for during the pilot testing;

selecting the target population; and setting a threshold level for the pilot testing metric.

14. The method of claim 12, further comprising calculating a validation score for the pilot testing.

15. The method of claim 14, further comprising generating a validation pass or fail notification based at least in part on the validation score.

16. The method of claim 14, further comprising automatically selecting a course of action based at least in part on the validation score.

17. The method of claim 12, further comprising selecting the one or more hardware assets.

18. The method of claim 12, wherein the pilot test metric includes at least one of a system health metric, usage metric, customer sentiment metric and performance metric.

19. A non-transitory computer readable medium on which are stored instructions that when executed cause a programmable device to:

collect pilot testing data generated from a pilot testing of a software program run on one or more hardware assets in an organization;

determine whether an amount of the collected pilot testing data satisfies a predetermined threshold for evaluating the software program;

upon determining that the amount of the collected pilot testing data satisfies the predetermined threshold for evaluating the software program, calculate a pilot test metric from the collected pilot testing data;

compare the calculated pilot testing metric with a corresponding metric in a target population;

calculate a deviation score, the deviation score being an amount of difference between the calculated pilot testing metric and the corresponding metric;

automatically evaluate the software program based on the calculated deviation score, wherein automatically evaluating the software program includes examining the deviation score to determine if the deviation score meets a threshold requirement; and automatically determine, at least in part, based on results of evaluating the software program, if the pilot testing of the software program should be extended to one or more other hardware assets of the organization or if the software program should be fully deployed in the organization.

20. The non-transitory computer readable medium of claim 19, wherein the instructions further cause the programmable device to:

identify one or more parameters to collect the pilot testing data for during the pilot testing;

select the target population; and set a threshold level for the pilot testing metric.

21. The non-transitory computer readable medium of claim 19, wherein the instructions further cause the programmable device to calculate a validation score for the pilot testing.

22. The non-transitory computer readable medium of claim 21, wherein the instructions further cause the programmable device to generate a validation pass or fail notification based at least in part on the validation score.

23. The non-transitory computer readable medium of claim 19, wherein the pilot test metric includes at least one of a system health metric, usage metric, customer sentiment metric and performance metric.

24. The non-transitory computer readable medium of claim 19, wherein the target population comprises at least one of a pre-pilot testing population, a pilot testing population of one or more other organizations, and a global target population.

* * * * *